(12) United States Patent
Kaki et al.

(10) Patent No.: US 10,728,817 B1
(45) Date of Patent: Jul. 28, 2020

(54) USER PLANE NODE SELECTION OPTIMIZATION FOR HANDOVERS BETWEEN 5G AND 4G COMMUNICATION SYSTEMS

(71) Applicant: Cisco Technology, Inc., San Jose, CA (US)

(72) Inventors: Somaraju Kaki, Bangalore (IN); Sandeep Dasgupta, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/283,399

(22) Filed: Feb. 22, 2019

(51) Int. Cl.
*H04W 36/14* (2009.01)
*H04L 29/12* (2006.01)

(52) U.S. Cl.
CPC ......... *H04W 36/14* (2013.01); *H04L 61/1511* (2013.01)

(58) Field of Classification Search
None
See application file for complete search history.

(56) References Cited

U.S. PATENT DOCUMENTS

| | | | |
|---|---|---|---|
| 2011/0080890 A1* | 4/2011 | Cai | H04W 36/0033 370/331 |
| 2013/0272256 A1 | 10/2013 | Mihaly et al. | |
| 2017/0034749 A1 | 2/2017 | Chandramouli et al. | |
| 2017/0126618 A1* | 5/2017 | Bhaskaran | H04L 61/2007 |
| 2018/0132141 A1* | 5/2018 | Huang-Fu | H04L 65/1016 |
| 2019/0053105 A1 | 2/2019 | Park et al. | |

(Continued)

FOREIGN PATENT DOCUMENTS

| | | |
|---|---|---|
| CN | 109167670 A | 1/2019 |
| WO | 2018006017 | 1/2018 |
| WO | 2018128494 | 7/2018 |

(Continued)

OTHER PUBLICATIONS

International Search Report and Written Opinion from the International Searching Authority, dated Apr. 23, 2020, 17 pages, for corresponding International Patent Application No. PCT/US2020/018761.

(Continued)

*Primary Examiner* — Peter Chen
(74) *Attorney, Agent, or Firm* — Polsinelli PC

(57) ABSTRACT

Systems, methods, and computer-readable media are provided for optimizing user plane node selection process during a process of handing over user equipment between two communication networks. In one aspect, a method includes receiving, at a network component, a session creation request for handing over the user equipment, the user equipment having a current active communication session within a first communication network with a first node of the first communication network, the session creation request including an identifier of the first node; receiving, at the network component, a list of candidates to serve as a user plane serving gateway for the user equipment in the second communication network; and selecting, by the network component and based on at least the identifier of the first node, the first node from the list of candidates to serve as the user plane serving gateway for the user equipment in the second communication network.

18 Claims, 7 Drawing Sheets

(56) References Cited

U.S. PATENT DOCUMENTS

2019/0098547 A1* 3/2019 Chong .................. H04W 36/12

FOREIGN PATENT DOCUMENTS

| WO | 2018145671 | 8/2018 |
|----|------------|--------|
| WO | 2018199952 | 11/2018 |

OTHER PUBLICATIONS

"3$^{rd}$ Generation Partnership Project; Technical Specification Group Core Network and Terminals; Domain Name System Procedures; Stage 3 (Release 15)," 3GPP TS 29.203 V15.1.0 (Mar. 2018), Mar. 30, 2018, pp. 1-73.

Nokia et al., "Pseudo-CR on CP and UP selection functions," 3GPP Draft; C4-172056, 3$^{rd}$ Generation Partnership Project (3GPP), Apr. 3, 2017, 6 pages.

Vodafone, "User plane function selection for URLLC," 3GPP Draft; S2-178596 UPF Selection for ULLC, 3$^{rd}$ Generation Partnership Project (3G99), Mobile Competence Centre, Nov. 21, 2017, 4 pages.

* cited by examiner

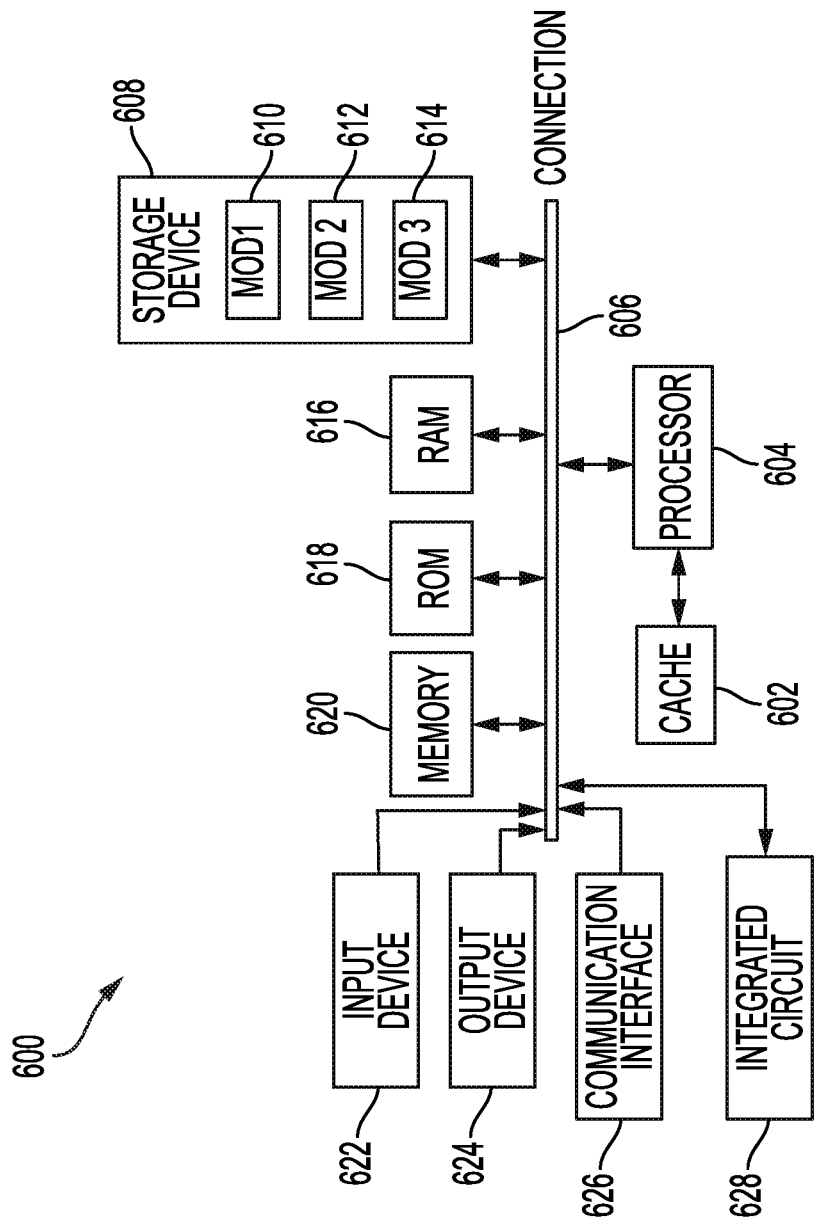

USER PLANE NODE SELECTION OPTIMIZATION FOR HANDOVERS BETWEEN 5G AND 4G COMMUNICATION SYSTEMS

TECHNICAL FIELD

The present technology pertains in general to handovers of user equipment operating in a 5G network to a 4G network and vice-versa, and more specifically to optimizing user plane node selection process during such handovers.

BACKGROUND $3^{rd}$ Generation Partnership Project (3GPP) specifies interworking between 4th Generation (4G) communication networks and $5^{th}$ Generation (5G) communication networks and also provides procedures in 5G Standalone (SA) architecture for enabling a 5G capable user equipment (UE) to handover from 5G New Radio (NR) to 4G Evolved UMTS Terrestrial Radio Access Network (EUTRAN) and vice-versa.

When a Protocol Data Unit (PDU) session is created on a 5G core for a UE, a User Plane Function (UPF) node is selected by a Session Management Function (SMF) to forward and process the data packets destined for and/or originating from the UE. During a handover of the UE from 5G to 4G EUTRAN, the Access and Mobility Management Function (AMF) node of the 5G network selects a 4G Mobility Management Entity (MME) node and initiates a context transfer to LTE core of the 4G EUTRAN network. As a part of this process, the MME node selects a Serving Gateway Control Plane (SGW-C) node and the SGW-C node in turn selects a Serving Gateway User Plane (SGW-U) node (in a Control and User Plane Separation of Evolved Packet Core nodes (CUPS) based LTE core). This SGW-C node then communicates with the Packet Gateway Control Plane (PGW-C) component of the SMF node to setup the LTE session.

Due to addition of SGW-U node in data path, the data to/from the UE in the 4G network now has one additional hop to travel (eNodeB→SGW-U→UPF→Data Network (DN) for uplink and DN→UPF→SGW-U→eNodeB for downlink). A typical user plane node can support functionalities of all SGW-U, PGW-U and UPF nodes. However in the currently defined 3GPP procedure for 5G to 4G handover, there is no mechanism for the SGW-C node to know whether the UPF node in the 5G core can also act as a SGW-U node in the 4G network for the UE. Also, SGW-C has no mechanism to know the identity of the UPF node selected by SMF node in 5G core. Hence, a SGW-C node, as of today, cannot guarantee selection of same user plane node to avoid the extra hop in data path as mentioned above. This lack of guarantee of the selection of the same user plane node as the SGW-U results in the above four-hop process, examples of which are visually depicted in FIGS. 1 and 2.

FIG. 1 illustrates an example of a four-hop process after a 5G to 4G handover of a UE. As noted above, the handover process currently specified by 3GPP does not guarantee that the same user plane node 102 used as the UPF node in the 5G network for UE 100 is again selected as the SGW-U for UE 100 when UE 100 is handed over to the 4G network (from the 5G plane to the 4G plane shown in FIG. 1). Instead, SGW-U 104 may have been selected. Therefore, any communication between UE 100 and DN 106 involves UE 100 communicating with eNB 108 (D1), eNB 108 communicating with the selected SGW-U 104 (D2), SGW-U 104 communicating with the old SGW-U+UPF/PGW-U node 102 (D3) and SGW-U+UPF/PGW-U node 102 communicating with DN 106 (D4). Therefore, a data path between UE 100 and DN 106 includes D1→D2→D3→D4.

FIG. 2 illustrates another example of a four-hop process after a 5G to 4G handover of a UE. Similar to FIG. 1, the handover process currently specified by 3GPP does not guarantee that the same user plane node 102 used as the UPF node in the 5G network for UE 100 is again selected as the SGW-U for UE 100 when handed over to the 4G network (from the 5G plane to the 4G plane shown in FIG. 1). Instead, SGW-U 200 may have been selected. Therefore, any communication between UE 100 and DN 106 involves UE 100 communicating with eNB 108 (D1), eNB 108 communicating with the selected SGW-U 200 (D2), SGW-U 200 communicating with the old SGW-U+UPF/PGW-U node 102 (D3) and SGW-U+UPF/PGW-U node 102 communicating with DN 106 (D4). Therefore, a data path between UE 100 and DN 106 includes D1→D2→D3→D4.

This four-hop process in the data path can also add to latency and may impact the low latency requirement for 5G applications.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates an example system including various hardware computing components, according to an aspect of the present disclosure.

DETAILED DESCRIPTION

Figure 1:
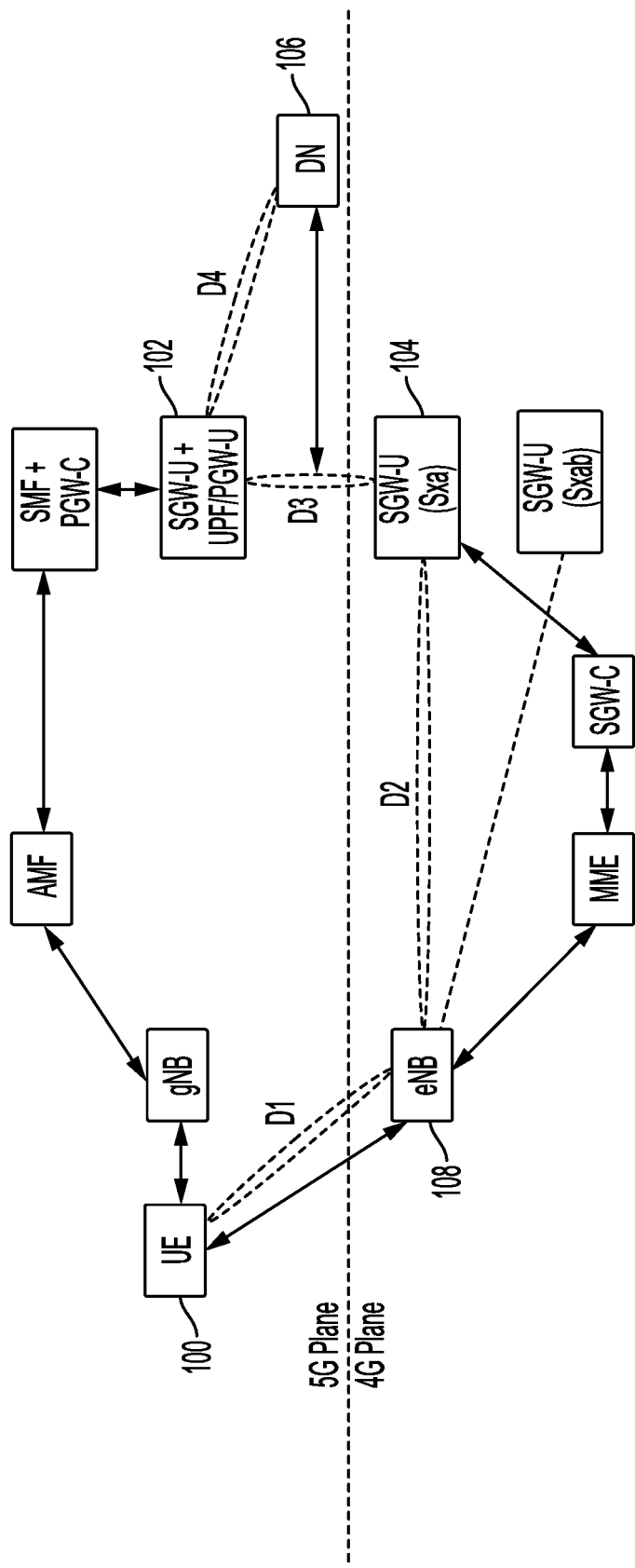
FIG. 1 illustrates an example of a four-hop process after a 5G to 4G handover of a UE.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, methods, and computer-readable media for ensuring that when a 5G capable UE that is currently having an active communication session within a 5G or a 4G network, using a user plane PDN gateway (PGW-U)/UPF node, can be handed over to the other one of a 4G or a 5G network, where after the handover, the same user plane PDN gateway (PGW-U)/UPF node is selected as the SGW-U for the UE.

In one aspect of the present disclosure, a method includes receiving, at a network component, a session creation request for handing over a user equipment from a first communication network to a second communication network, the user equipment having a current active communication session within the first communication network with a first node of the first communication network acting as a peer node of the user equipment, the session creation request including an identifier of the first node; receiving, at the network component, a list of candidates to serve as a user plane serving gateway for the user equipment in the second communication network, the list of candidates including the first node; selecting, by the network component and based on at least the identifier of the first node, the first node from the list of candidates to serve as the user plane serving gateway for the user equipment in the second communication network; and establishing, by the network component, a new session for the user equipment in the second communication network using the first node as the user plane serving gateway for the user equipment in the second communication network.

In one aspect of the present disclosure, a controller includes a memory having computer-readable instructions stored therein and one or more processors configured to execute the computer-readable instructions to receive a session creation request for handing over a user equipment from a first communication network to a second communication network, the user equipment having a current active communication session within the first communication network with a first node of the first communication network acting as a peer node of the user equipment, the session creation request including an identifier of the first node; receive a list of candidates to serve as a user plane serving gateway for the user equipment in the second communication network, the list of candidates including the first node; select, based on at least the identifier of the first node, the first node from the list of candidates to serve as the user plane serving gateway for the user equipment in the second communication network; and establish a new session for the user equipment in the second communication network using the first node as the user plane serving gateway for the user equipment in the second communication network.

In one aspect of the present disclosure, one or more non-transitory computer-readable media have computer-readable instruction stored thereon, which when executed by one or more processors, cause the one or more processors to receive a session creation request for handing over a user equipment from a first communication network to a second communication network, the user equipment having a current active communication session within the first communication network with a first node of the first communication network acting as a peer node of the user equipment, the session creation request including an identifier of the first node; receive a list of candidates to serve as a user plane serving gateway for the user equipment in the second communication network, the list of candidates including the first node; select, based on at least the identifier of the first node, the first node from the list of candidates to serve as the user plane serving gateway for the user equipment in the second communication network; and establish a new session for the user equipment in the second communication network using the first node as the user plane serving gateway for the user equipment in the second communication network.

DETAILED DESCRIPTION

The disclosed technology addresses the need in the art for reducing a number of hops or network nodes through which a data packet can be exchanged between a user equipment and a data network within a 5G or a 4G network after the user equipment is handed over from a 5G network to a 4G network or vice-versa. In other words, the disclosed technology herein ensures an optimized user plane node selection process after the handover to ensure the reduction in the number of hops.

The disclosure begins with a description of example 5G network architecture.

Figure 3A:
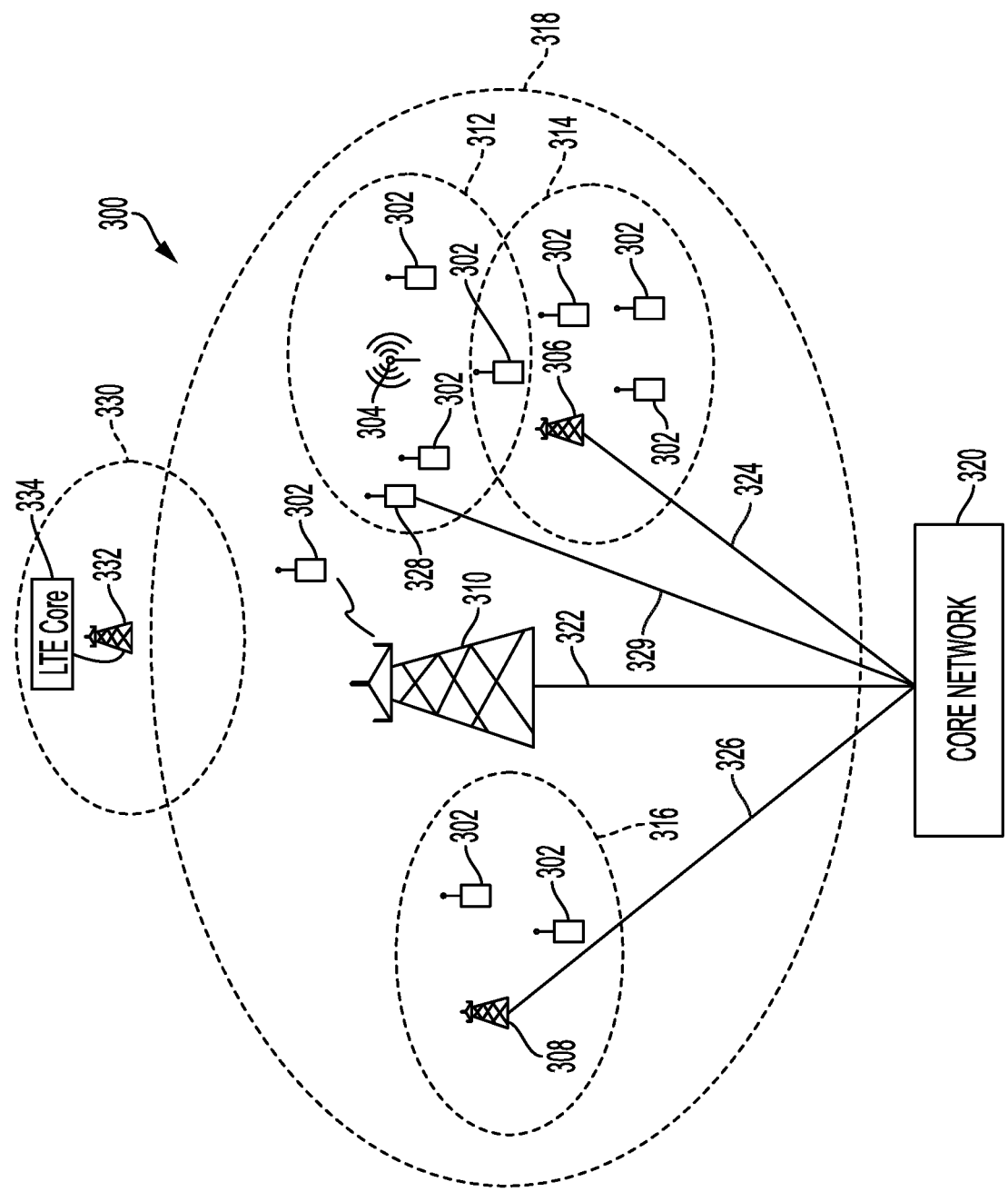
FIGS. 3A-B illustrates an example of network architecture and associated components, according to an aspect of the present disclosure.
Figure 3B:
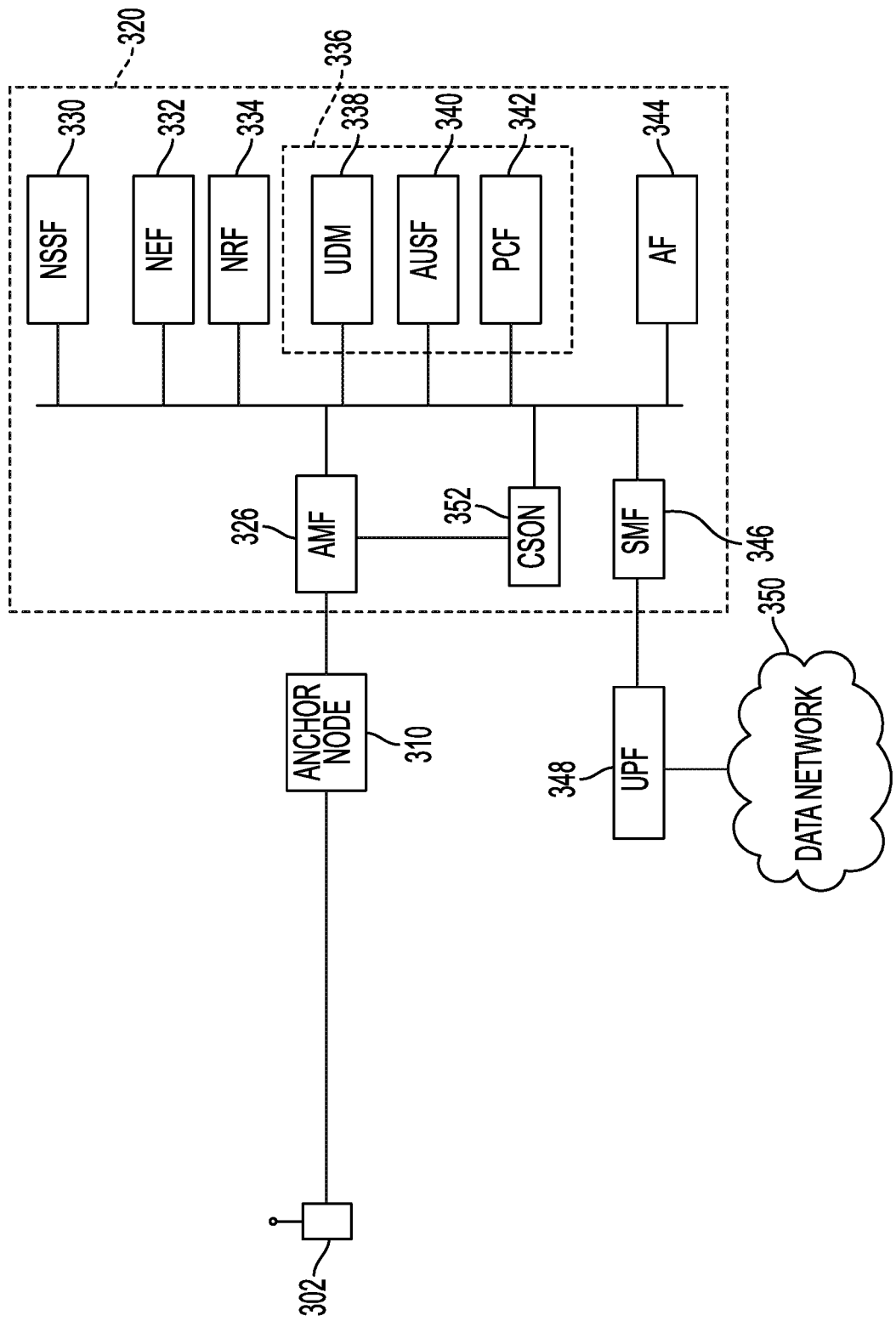

FIGS. 3A-B illustrates an example of network architecture and associated components, according to an aspect of the present disclosure. As shown in FIG. 3A, network 300 is a 5G wireless communication network. Network 300 can include a number of user equipment (UE) 302. UEs 302 can be any type of known or to be developed device capable of establishing communication over a wireless/radio access technology with other devices. Examples of UEs 302 include, but are not limited to, various types of known or to be developed smart phones, laptops, tablets, desktop computers, Internet of Things (IoT) devices, etc.

UEs 302 can have multiple different radio access technology (RAT) interfaces to establish a wireless communication session with one or more different types of base stations (nodes) that operate using different RATs with network 300. For example, a UE 302 can have a 5G interface as well as a 4G interface. Therefore, such UE 302 can be, from time to time and as the need may arise, be handed over from a 5G network to a neighboring 4G network and vice-versa.

Network 300 may also include nodes 304, 306, 308 and 310. Nodes 304, 306, 308 and 310 can also be referred to as base stations or access points 304, 306, 308 and 310. For example, node 304 can be a WiFi router or access point providing a small cell site or coverage area 312 for several of the UEs 302 therein. Therefore, node 304 may be referred to as a small cell node. Nodes 306 and 308 can be any one of various types of known or to be developed base stations providing one or more different types of Radio Access Networks (RANs) to devices connecting thereto. Examples of different RANs include, but are not limited to, Global System for Mobile Communication (GSM), General Packet Radio Service (GPRS)/Enhanced Data Rates for GSM Evolution (EDGE), Universal Mobile Telecommunications System (UMTS), Long-Term Evolution (LTE), LTE-advanced, Worldwide Interoperability for Microwave Access (Wi-MAX), WiFi, Code Division Multiple Access (CDMA), Evolution-Data Optimized (EV-DO), IS-95 etc.

Node 306 can provide coverage area 314 for end points 302 within coverage area 314. As shown in FIG. 3A, one or more UEs 302 can be located on an overlapping portion of coverage areas 312 and 314. Therefore, such one or more UEs 302 can communicate with node 304 or node 306.

Furthermore, node 308 can provide coverage area 316 for some of UEs 302 in coverage area 316. Node 310 can provide coverage area 318 for all UEs 302 shown in FIG. 3A.

Within the 5G structure of network 300, nodes 304, 306, 308 and 310 may operate in a connected manner to expand the coverage area provide by node 310 and/or to serve more UEs 302 than node 310 or some of the nodes 304, 306, 308 and 310 can handle individually. Node 304 may be communicatively coupled to node 306, which may in turn be communicatively coupled to node 310. Similarly node 308 can be communicatively coupled to node 306 and/or node 310. Node 304 and node 306 can communicate with node 310 via any known or to be developed wireless communication standard. Also, node 308 can communicate with node 310 via any known or to be developed wireless communication standard.

Within network 300, node 310 can have a wired connection to core network 320 via, for example, fiber optics cables. This may be referred to as backhaul 322 or backhaul connection 322. While fiber optic cables is mentioned as one example connection medium for backhaul 322, the present disclosure is not limited thereto and the wired connection can be any other type of know or to be developed wire.

Furthermore, each of nodes 306, 308 and 310 can be any type of know or to be developed base station such as a next generation or 5G e-NodeB, which may also be referred to a global NodeB (gNB). Each of nodes 306 and 308 can have separate backhaul connections 326 and 328 to core network 320. Connections 324 and 326 can be the same as backhaul connection 322. In an example, where node 304 is a WiFi node, node 304 can connect to Core network 320 via a node 328, which can be a N3 Interworking Function (N3IWF) node. Connection 329 between node 328 and Core network 320 can be the same as backhaul connection 322.

FIG. 3A further illustrates a 4G/LTE network 330 which may overlap, geographically, with 5G network 300. 4G network 330 may have a corresponding eNode-B 332 and 4G/LTE core 334. For purposes of this disclosure, an assumption is made that UE 302 (e.g., UE 302 shown in FIG. 3A having a direct connection to anchor node 310) can be handed over from 5G network 300 to 4G network 330 and vice-versa.

FIG. 3B illustrates another example architecture with components of core network 320 of FIG. 3A, according to an aspect of the present disclosure. A simplified version of network 300 is shown in FIG. 3B, where a single UE 302 has a wireless communication session established with anchor node 310. Anchor node 310 is in turn connected to core network 320 via backhaul 322.

Furthermore, FIG. 3B illustrates example logical components of core network 320. Example components/nodes of core network 320 include various network functions implemented via one or more dedicated and/or distributed servers (can be cloud based). Core network 320 of 5G network 300 can be highly flexible, modular and scalable. It can include many functions including network slicing. It offers distributed cloud-based functionalities, Network functions virtualization (NFV) and Software Defined Networking (SDN).

For example and as shown in FIG. 3B, core network 320 has Application and Mobility Management Function (AMF) 326, with which anchor node 310 communicates (e.g., using an N2 interface). Core network 320 further has a bus 328 connecting various servers providing different example functionalities. For example, bus 328 can connect AMF 326 to Network Slice Selection Function (NSSF) 330, Network Exposure Function (NEF) 332, Network Repository Function (NRF) 334, Unified Data Control (UDC) 336, which itself can include example functions including Unified Data Management (UDM) 336, Authentication Server Function (AUSF) 340, Policy Control Function (PCF) 342, Application Function (AF) 344 and Session Management Function (SMF) 346. In one example, a node serving as SMF 346 may also function as a control plane Packet Gateway (PGW-C) node. Various components of core network 320, examples of which are described above, provide known or to be developed functionalities for operation of 5G networks including, but not limited to, device registration, attachment and authentication, implementing network policies, billing policies, etc.

Furthermore, as shown in FIG. 3B, SMF 346 is connected to User Plane Function (UPF) 348, which in turns connects core network 320 and/or UE 302 (after authentication and registration with core network 320) to data network (DN) 350. In one example, a node serving as UPF 348 may also function as a user plane Packet Gateway (PGW-C) node and/or a user plane Serving Gateway (SGW-U) node.

While FIG. 3B illustrates an example structure and components of core network 320, the present disclosure is not limited thereto. Core network 320 can include any other number of known or to be developed logical functions and components and/or can have other known or to be developed architecture.

Furthermore, core network 320 can have a centralized Self Organizing Network (CSON) function/server 352 connected to AMF 326. CSON server 352 can have a dedicated server for performing functionalities thereof, which will be described below, or can have functionalities thereof distributed among existing servers of core network 320.

For purposes of illustration and discussion, network 300 has been described with reference to a limited number of UEs 302, nodes 304, 306, 308, 310, etc. However, inventive concepts are not limited thereto.

Furthermore, while certain components have been illustrated and described with reference to FIGS. 3A-B, network 300 can include any other known or to be developed elements or components for its operation.

As noted above, when UE 302 has an active session established with 5G core network 320, a PDU session is created in core network 320 where a UPF node such as UPF 348 is selected by SMF 346 to forward and process data packets destined for or originating from UE 302. In other words, UE 302 is connected to gNB (anchor node), AMF 326, SMF 346, UPF 348 and ultimately DN 350.

Figure 4:
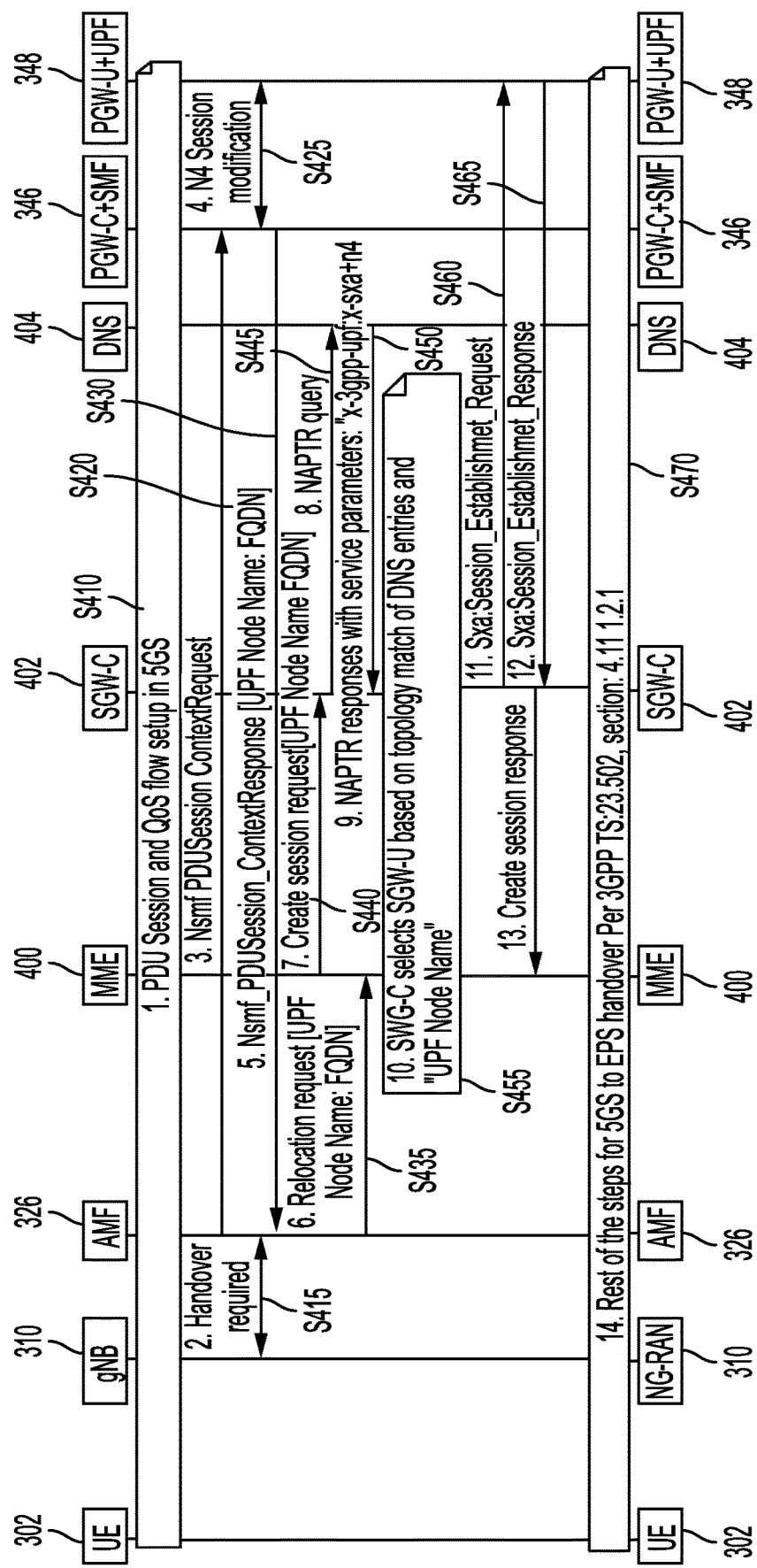
FIG. 4 illustrates a handover process of a UE from a 5G network to a 4G network, according to one aspect of the present disclosure.

FIG. 4 illustrates a handover process of a UE from a 5G network to a 4G network, according to one aspect of the present disclosure. FIG. 4 illustrates the interaction among several components some of which include UE 302, gNB 310, AMF 326, PGW-C+SMF 346 (which will also be referred to as simply SMF 346) and PGW-U+UPF 348 (which will also be referred to as simply UPF 348) described above with reference to FIGS. 3A-B. FIG. 4 illustrates a number of additional components such as Mobility Management Entity (MME) 400 and SGW-C 402, both of which can form elements of LTE/4G core 334 shown in FIG. 3A. FIG. 4 also illustrates a Domain Name System (DNS) server 404, the use of which will be further described with reference to the handover process in FIG. 4.

As noted above, a current active PDU session in 5G network 500 may exist for UE 302 shown as at S410 in FIG. 4. Thereafter, a determination is made that UE 302 should be handed over from 5G network 300 to 4G network 330. Such handover may be due to reasons including, but not limited to, better 4G coverage for UE 302, offloading of traffic from 5G network to 4G network for load balancing, etc. Therefore, at S415, gNB 310 sends a Handover Required message to AMF 326 indicating a need to perform a 5G to 4G handover.

At S420, AMF 326 sends a message to SMF 346 (PGW-C+SMF 346) to fetch Session Management (SM) context for the PDU session of S410. The message can be a Nsmf_PDUSession_ContextRequest message.

At S425, SMF 346 communicates with UPF 348 (SGW-U+UPF 348) to obtain EPS bearer context for the PDU session as part of the requested SM context received at S420.

At S430, SMF 346 sends a response to the SM context back to AMF 326 as part of a Nsmf_PDUSession_ContextResponse message. As part of the response sent at S430, SMF 346 also sends a UPF node name of UPF 348 to the SMF 346. UPF node name can be UPF 348's Fully Qualified Domain Name (FQDN), which can be sent in a custom Jason attribute back to AMF 326.

At S435 and upon performing a MME selection in the 4G plane of 4G network 330 (according to any known or to be developed method of MME selection, which in one example can result in MME 400 being selected), AMF 326 forwards the SM context received from SMF 346 along with the UPF node Name is a custom attribute of a Relocation Request message to MME 400.

At S440 and upon performing a SGW-C selection in the 4G plane of 4G network 330 (according to any known or to be developed method of SGW-C selection, which in one example can result in SGW-C 402 being selected), MME 400 forwards SM context along with the UPF Node Name to SGW-C 402 in a custom attribute of a Create Session Request message.

At S445, SGW-C 402 initiates SGW-U selection by sending a Name Authority Pointer (NAPTR) query to DNS 404 to fetch all possible SGW-U candidates to SGW-C 402. In one example such candidates can include SGW-U 102, 104 and 200 shown in FIGS. 1 and 2.

At S450, DNS 404 responds by providing all candidate nodes along with their corresponding FQDN and service parameters. In one example, a service provider of 5G network 300 can configure a new service parameter for all SGW-U nodes that support Sxa and N4 services. Such service parameter can have the format "x-3gpp-upf:x-sxa+n4."

At S455, SGW-C 402 selects one of the SGW-U candidates received from DNS 404 by performing a topology match using the service parameter described above and the UPF Node Name of UPF 348 received at S430. The process at S445, ensures that SGW-C 402 selects, from among all SGW-U candidates (e.g., SGW-U 102, 104 and 200), the same PGW-U+UPF node 348 that served as the PDU node (peer N4 node) of UE 302 while UE 302 was active on 5G network 300, as the new SGW-U node for UE 302 in the 4G network 330, making the selected SGW-U and PGW-U+UPF nodes co-located. The co-location can be ensured by performing a topology match between candidate FQDNs received at S450 from DNS 404 and FQDN received as part of the SM Context at S440.

Thereafter, at S460, SGW-C 402 initiates Sx Session Establishment Request toward the selected SGW-U (which is the same as SGW-C+UPF 348) for setting up sxa related Packet Detection Rule (PDR) and Forwarding Action Rules (FARs).

At S460, selected SGW-U node accepts the parameters in Sx Session Establishment Response message and sends a response back to SGW-C 402.

At S465, SGW-C 402 sends a Create Session Response message back to MME 400 in response to the Create Session Request received at S440.

Thereafter, at S470, the remaining handover steps for a 5G to 4G handover, as specified in $3^{rd}$ Generation Partnership Project (3GPP) specification 23.502 can be implemented to complete the 5G to 4G handover of UE 302.

The process of FIG. 5 achieves a reduction in number of hops when UE 302 communicates with DN 106 after a handover, which will be described below.

While FIG. 4 has been described with reference to a specific example of a 5G to 4G handover of a UE, the present disclosure is not limited thereto and the process can be applied equally for a 4G to 5G handover to ensure selection of the same 4G SGW-U node as the PGW-U+UPF node in the 5G network.

Figure 5:
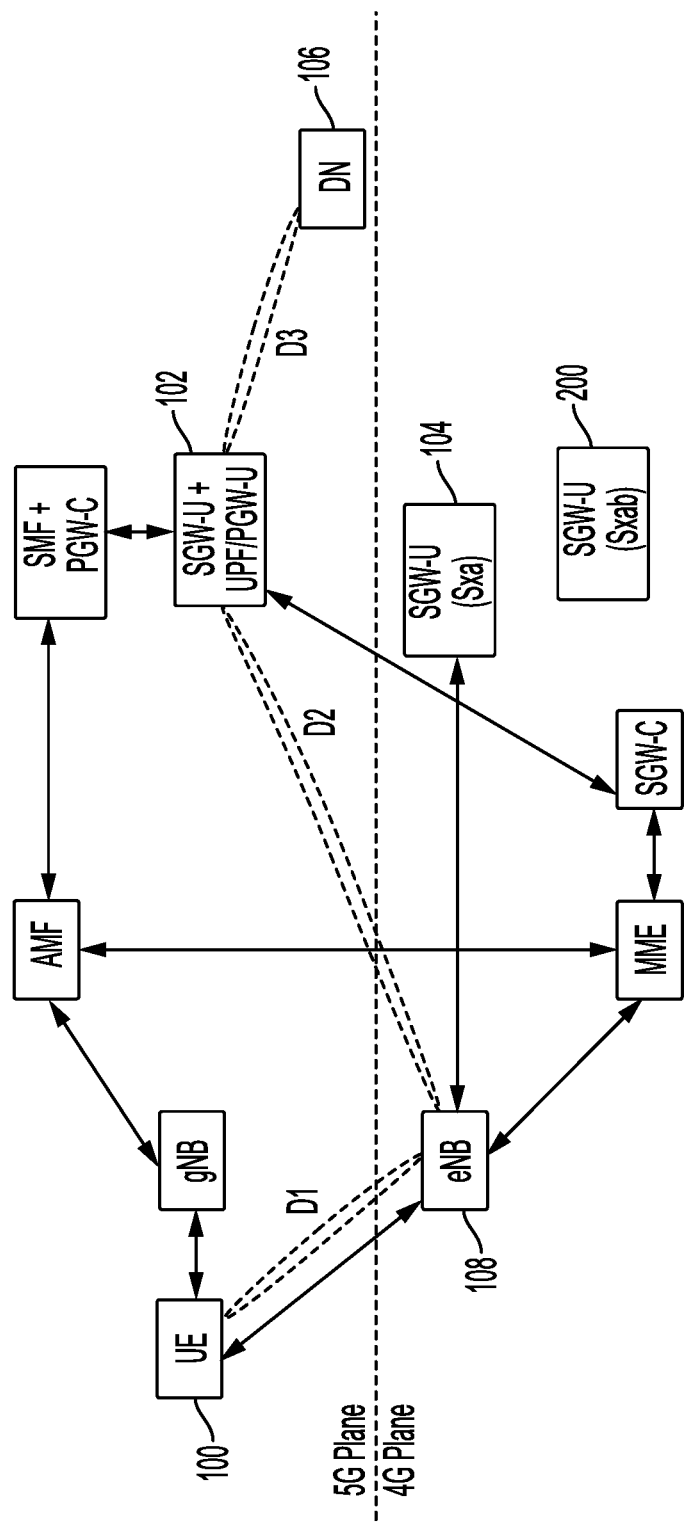
FIG. 5 illustrates an example three-hop communication process for a UE after performing handover process of FIG. 4, according to one aspect of the present disclosure.

FIG. 5 illustrates an example three-hop communication process for a UE after performing handover process of FIG. 4, according to one aspect of the present disclosure.

Figure 2:
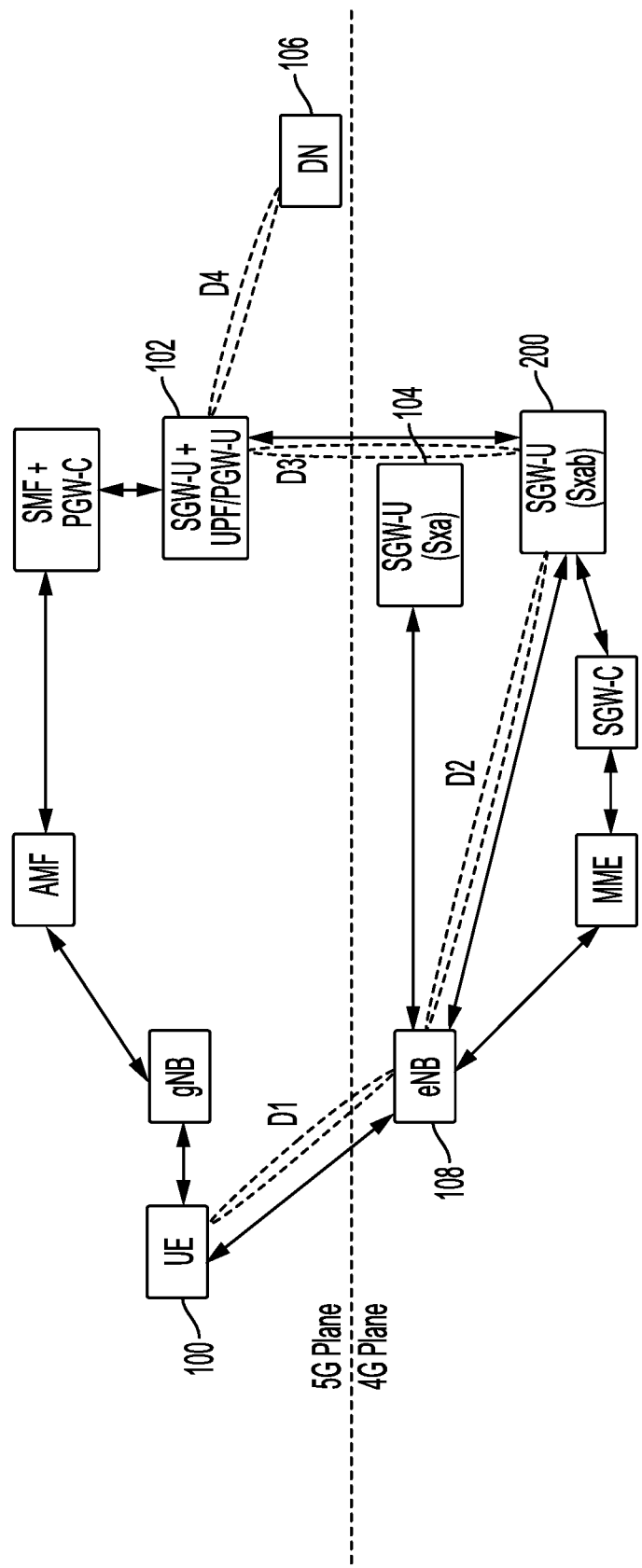
FIG. 2 illustrates another example of a four-hop process after a 5G to 4G handover of a UE.

In describing the state of the art with respect to FIGS. 1 and 2 above, it was noted that because the selection of the same 5G UPF node as the new SGW-U node in the 4G network is not guaranteed currently, the resulting communication between UE 302 and DN 106 is a four-hop process (D1→D2→D3→D4). FIG. 5 illustrates the efficiency gained and hence the reduction of the four-hop process to a three-hop process because the selection of the 5G UPF as the SGW-U node in the 4G network is guaranteed.

As shown in FIG. 5 and using same reference numerals as FIGS. 1 and 2 for purposes of illustrating differences, a data path between UE 100 (Same as UE 302) and DN 106 now includes D1 (from UE 302 to eNodeB 108), D2 (from eNodeB 108 to SGW-U/PGW-U+UPF 102 (which can be the same as SGW-U/PGW-U+UPF 348 of FIG. 4) and D3 (from SGW-U/PGW-U+UPF 102 to DN 106).

This three step process can reduce latency in data paths that can be critical to low latency requirement of 5G applications.

Having described example embodiments for ensuring optimized selection of SGW-U after a 5G to 4G handover (or PGW-U+UPF after a 4G to 5G handover), the disclosure now turns to discussion of example devices that can be used as components within 5G network 300 and/or 4G network 330 as various nodes thereof (e.g., SGW-C 402, SMF 346, UPF 348, MME 400, AMF 326, etc.) or a controller controlling functionalities of each node of such network to implement the handover processes described above.

FIG. 6 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 6 illustrates a system bus computing system architecture (system) 600 wherein the components of the system are in electrical communication with each other using a connection 606. Exemplary system 600 includes a cache 602 and a processing unit (CPU or processor) 604 and a system connection 606 that couples various system components including the system memory 620, such as read only memory (ROM) 618 and random access memory (RAM) 616, to the processor 604. System 600 can include a cache of high-speed memory connected directly with, in close proximity to, or integrated as part of the processor 604. System 600 can copy data from the memory 620 and/or the storage device 608 to the cache 602 for quick access by the processor 604. In this way, the cache can provide a performance boost that avoids processor 604 delays while waiting for data. These and other modules can control or be configured to control the processor 604 to perform various actions. Other system memory 620 may be available for use as well. The memory 620 can include multiple different types of memory with different performance characteristics. The processor 604 can include any general purpose processor and a service component, such as service 1 610, service 2 612, and service 3 614 stored in storage device 608, configured to control the processor 604 as well as a special-purpose processor where software instructions are incorporated into the actual processor design. The processor 604 may essentially be a completely self-contained computing system, containing multiple cores or processors, a bus, memory controller, cache, etc. A multi-core processor may be symmetric or asymmetric.

To enable user interaction with system 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with system 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 616, read only memory (ROM) 618, and hybrids thereof.

System 600 can include an integrated circuit 628, such as an application-specific integrated circuit (ASIC) configured to perform various operations. The integrated circuit 628 can be coupled with the connection 606 in order to communicate with other components in system 600.

The storage device 608 can include software services 610, 612, 614 for controlling the processor 604. Other hardware or software modules are contemplated. The storage device 608 can be connected to the system connection 606. In one aspect, a hardware module that performs a particular function can include the software component stored in a computer-readable medium in connection with the necessary hardware components, such as the processor 604, connection 606, output device 624, and so forth, to carry out the function.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
receiving, at a Serving Gateway Control Plane (SGCP) from a Mobile Management Entity (MME), a session creation request for handing over a user equipment from a first communication network to a second communication network, the user equipment having a current active communication session within the first communication network with a first node of the first communication network acting as a peer node of the user equipment, the session creation request including an identifier of the first node;
receiving, at the SGCP from a Domain Name System (DNS), a list of candidates to serve as a user plane serving gateway for the user equipment in the second communication network, the list of candidates including the first node;
selecting, by the SGCP and based on at least the identifier of the first node, the first node from the list of candidates to serve as the user plane serving gateway for the user equipment in the second communication network; and
establishing, by the SGCP, a new session for the user equipment in the second communication network using the first node as the user plane serving gateway for the user equipment in the second communication network.

2. The method of claim 1, wherein the first communication network is a 5G communication network and the second communication network is a 4G communication network.

3. The method of claim 2, wherein the first node is an N4 peer node of the user equipment in the current active communication session.

4. The method of claim 3, further comprising:
querying, by the SGCP, the Domain Name Server (DNS) for the list of candidates, each candidate having a corresponding service parameter indicating whether the corresponding candidate supports N4 and Sxa services.

5. The method of claim 1, wherein the selection of the first node as the user plane serving gateway is further based on performing a topology match using corresponding service parameters of the candidates.

6. The method of claim 1, wherein the identifier of the first node is a Fully Qualified Domain Name (FQDN) of the first node.

7. The method of claim 1, further comprising:
sending, by the SGCP, a confirmation message to a mobility management entity of the second communication network confirming establishment of the new session.

8. A Serving Gateway Control Plane (SGCP) comprising:
memory having computer-readable instructions stored therein; and
one or more processors programed to execute the computer-readable instructions to:
receive from a Mobile Management Entity (MME) a session creation request for handing over a user equipment from a first communication network to a second communication network, the user equipment having a current active communication session within the first communication network with a first node of the first communication network acting as a peer node of the user equipment, the session creation request including an identifier of the first node;
receive from a Domain Name System (DNS) a list of candidates to serve as a user plane serving gateway for the user equipment in the second communication network the list of candidates including the first node;
select, based on at least the identifier of the first node, the first node from the list of candidates to serve as the user plane serving gateway for the user equipment in the second communication network; and
establish a new session for the user equipment in the second communication network using the first node as the user plane serving gateway for the user equipment in the second communication network.

9. The SGCP of claim 8, wherein the first communication network is a 5G communication network and the second communication network is a 4G communication network.

10. The SGCP of claim 9, wherein the first node is an N4 peer node of the user equipment in the current active communication session.

11. The SGCP of claim 10, wherein the one or more processors are further configured to execute the computer-readable instructions to:
query a Domain Name Server (DNS) for the list of candidates each candidate having a corresponding service parameter indicating whether the corresponding candidate supports N4 and Sxa services.

12. The SGCP of claim 11, wherein selection of the first node as the user plane serving gateway is further based on performing a topology match using corresponding service parameters of the candidates.

13. The SGCP of claim 8, wherein the identifier of the first node is a Fully Qualified Domain Name (FQDN) of the first node.

14. The SGCP of claim 8, wherein the one or more processors are further configured to execute the computer-readable instructions to:
send a confirmation message to a mobility management entity of the second communication network confirming establishment of the new session.

15. One or more non-transitory computer-readable media having computer-readable instructions stored therein, which when executed by one or more processors, cause the one or more processors to perform operations, comprising:
receive, at a Serving Gateway Control Plane (SGCP) from a Mobile Management Entity (MME), a session creation request for handing over a user equipment from a first communication network to a second communication network, the user equipment having a current active communication session within the first communication network with a first node of the first communication network acting as a peer node of the user equipment, the session creation request including an identifier of the first node;
receive, at the SGCP from a Domain Name System (DNS), a list of candidates to serve as a user plane serving gateway for the user equipment in the second communication network, the list of candidates including the first node;

select, by the SGCP, based on at least the identifier of the first node, the first node from the list of candidates to serve as the user plane serving gateway for the user equipment in the second communication network; and establish, by the SGCP, a new session for the user equipment in the second communication network using the first node as the user plane serving gateway for the user equipment in the second communication network.

16. The one or more non-transitory computer-readable media of claim 15, wherein the first communication network is a 5G communication network and the second communication network is a 4G communication network.

17. The one or more non-transitory computer-readable media of claim 15, wherein the one or more processors are further configured to execute the computer-readable instructions to:

query a Domain Name Server (DNS) for the list of candidates, each candidate having a corresponding service parameter indicating whether the corresponding candidate supports N4 and Sxa services.

18. The one or more non-transitory computer-readable media of claim 17, wherein selection of the first node as the user plane serving gateway is further based on performing a topology match using corresponding service parameters of the candidates.

* * * * *